Patented June 25, 1946

2,402,560

UNITED STATES PATENT OFFICE 2,402,560

ADDITION PRODUCTS OF THIOLACETIC ACID

Carl Martin Langkammerer, Wilmington, Del., assignor to E. I. du Pont de Nemours & Company, Wilmington, Del., a corporation of Delaware No Drawing. Application December 30, 1944, Serial No. 570,796

3 Claims. (Cl. 260—455)

This invention relates to new compositions of matter. More particularly it relates to new sulfur derivatives of polymers of isobutylene and still more particularly to thiol acid addition product of polymers of isobutylene having a boiling point below 130° C. at 7 mm.

This invention has as one of its objects the provision of aliphatic thiol esters. A further object is to provide new and useful chemicals for the synthetic rubber industry.

These objects are accomplished by reacting a thiol acid with a polymer of isobutylene having eight, twelve or sixteen carbon atoms. The radical of the thiol acid may be aliphatic or aromatic.

In some cases, the reaction proceeds without the addition of catalyst. In others, it is advantageous to add a peroxygen compound and also to irradiate with ultraviolet light. Although the reaction product may be nearly pure, it may be freed of unreacted starting materials and impurities by distillation. In these processes, one mol of the isobutylene polymer reacts with one mol of thiol acid. It is sometimes advantageous, however, to use a small excess (5–20%) of thiol acid.

The following examples in which parts are by weight are illustrative of the invention.

Example I

One hundred and fifty-two parts of thiolacetic acid were added with stirring to 246.5 parts of diisobutylene (10% excess), the addition being maintained at such a rate that the reaction mixture remained at 60° C. After all of the thiolacetic acid had been added, the reaction mixture was allowed to cool to room temperature and stand for 16 hours, at which time the thiol content of the reaction mixture was very low. The reaction mixture was distilled and 329 parts of product were collected, boiling point 104–107° C. at 17 mm., $n_D^{26}$, 1.4601. The yield was 87% of theory. The product consisted chiefly of 1-acetylthio-2,4,4-trimethyl-pentane. It contained 64.3% C, and 10.2% H, the values calculated for $C_{10}H_{20}OS$ being 63.8% C and 10.7% H.

Example II

Seventy-six parts of thiolacetic acid, 168 parts of triisobutylene and one part of benzoyl peroxide were mixed and allowed to stand for two days at 20–25° C., during which the thiol content dropped from an original value of 13.5% to 2.8%. Without further treatment, the reaction mixture was distilled. Ninety-five parts of product were collected, boiling point 109–124° C. at 3 mm. This material analyzed 67.2% C, 11.7% H, the values calculated for the formula $C_{12}H_{25}SCOCH_3$ being 68.6% C, 11.52% H.

Thiol acids other than thiolacetic acid which may be employed in preparing the compounds of this invention include the monocarbothiolic acids: thiolpropionic acid, thiolbutyric acid, thiolisovaleric acid, thiollauric acid, thiolpalmitic acid, thiolbenzoic acid, and chlorothiolacetic acid.

The polymeric isobutylenes, having a boiling point below 130° C. at 7 mm., used in the practice of this invention may be prepared by polymerizing isobutylene in any of several well-known ways or from tertiary butanol. Although the polymers may differ somewhat, depending upon the manner of preparation, diisobutylene consists principally of 2,4,4-trimethylpentene-1 and 2,4,4-trimethylpentene-2; triisobutylene is a more complex mixture containing among other constituents 1,1-neopentylethylene, 2,2,4,6,6-pentamethyl-3-heptene, 2,4,4,6,6-pentamethyl-1-heptene, and 2,4,4,6,6-pentamethyl-2-heptene; while tetraisobutylene is a still more complex mixture of compounds having the formula $C_{12}H_{24}$, such as 2,2,4,6,6,8,8-heptamethyl-3-nonene, and 2-neopentyl-4,4,6,6-tetramethyl-1-heptene. It is also possible to employ mixtures of polyisobutylenes in this invention.

In carrying out the reaction between the thiol acid and the polyisobutylene, temperatures of 20–80° C. are usually satisfactory, although higher or lower temperatures can also be used e. g. between 0° C. and 200° C. The length of time for the completion of the reaction varies with the reactants, the temperature of the reaction, and the catalyst, and the reaction may be completed in from several hours to several days. Although the reactions illustrated by the examples are carried out in the absence of solvent, a neutral inert solvent may be used, if desired. Examples of solvents which may be used include aromatic hydrocarbons such as benzene or toluene, aliphatic hydrocarbons, chlorinated aliphatic hydrocarbons, or ethers. Although the reaction is generally carried out at atmospheric pressure, other pressure conditions may be employed, if desired. When a catalyst is added, the amount used in proportion to the other reactants is small; generally from 0.1 to 1.0% based on total reactants by weight is sufficient.

The thiol esters of this invention are liquid to solid products, insoluble in water and alkali but hydrolyzable to thiols in alkaline media.

Chemically they may be represented by the general formula $$(C_nH_{2n+1})SCOR$$

wherein $n$ is eight, twelve or sixteen and R is a monovalent radical, preferably hydrocarbon and still more preferably lower alkyl. They are useful as insecticides, pharmaceuticals, and as chemical intermediates. They are particularly useful as rubber chemicals in the processing of synthetic rubber. In this respect, they have a marked advantage in utility over the thiolacetic acid addition product of monoisobutylene described in the prior art. For example, the thiolacetic acid/diisobutylene addition product, when used as a modifier (1%) in the polymerization of butadiene-styrene, gave a 100% product yield of a well-modified Buna S or GR–S in a 4% sodium oleate emulsion in 24 to 30 hours at 40° C. Isobutyl thiolacetate, on the other hand, inhibits polymerization except when used at very low concentrations (0.05 to 0.20%) and even then gives only a 40–60% yield of poorly modified GR–S. When used in concentrations of 0.75% or over, no solid polymer is formed in 24 hours at 40° C.

The use of esters of aliphatic carbothiolic acids of 1 to 6 carbons, in which acids carbothiolic hydrogen is replaced by an acyclic aliphatic radical of at least 6 carbon atoms, in the polymerization of dienes is more fully set forth in the co-pending application of W. H. Sharkey, Serial No. 569,431, filed December 22, 1944.

The above description and examples are intended to be illustrative only. Any modification thereof or variation therefrom which conforms to the spirit of the invention is intended to be included within the scope of the claims.

What is claimed is:

1. A thiolacetic acid addition product of an isobutylene polymer of 8 to 16 carbon atoms and of boiling point below 130° C. at 7 mm.

2. A thiolacetic acid addition product of diisobutylene.

3. A thiolacetic acid addition product of triisobutylene.

CARL MARTIN LANGKAMMERER.